(12) United States Patent
Huffman

(10) Patent No.: US 6,793,128 B2
(45) Date of Patent: Sep. 21, 2004

(54) FACE PHOTO STORAGE SYSTEM

(75) Inventor: John W. Huffman, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 198 days.

(21) Appl. No.: 09/883,621

(22) Filed: Jun. 18, 2001

(65) Prior Publication Data

US 2002/0190119 A1 Dec. 19, 2002

(51) Int. Cl.[7] .............................................. G06F 17/00
(52) U.S. Cl. ....................... 235/375; 235/382; 235/379
(58) Field of Search ................................. 235/375, 362, 235/379; 902/2, 3, 4, 5, 6; 382/115, 117, 118; 340/825.36, 825.54, 825.44, 539, 573, 505, 506; 348/373, 143, 239; 351/212, 247

(56) References Cited

U.S. PATENT DOCUMENTS

| | | | | |
|---|---|---|---|---|
| 3,988,533 A | * | 10/1976 | Mick et al. ................. 348/155 |
| 4,145,715 A | * | 3/1979 | Clever ........................ 348/150 |
| 5,151,945 A | * | 9/1992 | Lee et al. ................... 382/103 |
| 5,266,944 A | * | 11/1993 | Carroll et al. ......... 340/825.36 |
| 5,587,740 A | * | 12/1996 | Brennan ..................... 348/373 |
| 5,993,001 A | * | 11/1999 | Bursell et al. ............. 351/212 |
| 6,115,556 A | * | 9/2000 | Reddington ................. 396/267 |
| 6,128,398 A | * | 10/2000 | Kuperstein et al. ......... 382/118 |
| 6,213,395 B1 | * | 4/2001 | Dejaeger et al. ............ 235/383 |
| 6,343,739 B1 | * | 2/2002 | Lippert ....................... 235/383 |
| 6,366,311 B1 | * | 4/2002 | Monroe ....................... 348/148 |
| 6,411,209 B1 | * | 6/2002 | Lyons et al. ................ 340/541 |
| 6,504,481 B2 | * | 1/2003 | Teller ....................... 340/572.1 |
| 6,593,852 B2 | * | 7/2003 | Gutta et al. ................. 340/541 |

* cited by examiner

Primary Examiner—Michael G. Lee
Assistant Examiner—Kimberly D. Nguyen

(57) ABSTRACT

A face photo storage system is disclosed. A digital camera takes one or more photos of a person in response to the detection of an event, such as a cash register having rung up a sale to the person, the person entering the premises, and so on. The best photo of the person that includes the best picture of the person's face is determined. A database stores this photo, along with at least a current date in which the photo was taken. The database may also store the current time at which the photo was taken, a transaction record of the person's purchase, and so on. The invention may be used in conjunction with or in lieu of a video surveillance system.

20 Claims, 5 Drawing Sheets

FACE PHOTO STORAGE SYSTEM

FIELD OF THE INVENTION

The invention relates generally to recording persons, such as accomplished by video surveillance systems, and more particularly to storing a photo of a face of a person in response to detecting the person or in response to another event.

BACKGROUND OF THE INVENTION

Video surveillance systems, such as those used in small business settings like convenience and other stores, usually employ one or more video cameras. The video cameras are typically located in strategic positions within the given environment. For example, in a store, there may be one video camera aimed at the entrance to the store, and another video camera aimed at the counter of the store at which sales are rung up, such as where a cash register is located.

These surveillance systems may have the capability of recording on videotapes all people entering, making a purchase, and/or leaving the store. If a theft, robbery, or break-in occurs, the videotapes can be reviewed to determine whether a good image of the perpetrator has been recorded. This image can then be compared to mug shot databases maintained by law enforcement, circulated to news media to display during newscasts and in newspapers, and so on.

However, such surveillance systems have some disadvantages. For example, if a theft has occurred, but the exact time of which is not known, several days worth of videotape may have to be reviewed to learn who has perpetrated the theft. This can be a very time-consuming and inconvenient process. Furthermore, the image of the perpetrator recorded on the videotape may be of poor quality, making a positive identification from the image difficult if not impossible.

For these and other reasons, there is a need for the present invention.

SUMMARY OF THE INVENTION

The invention relates to a face photo storage system. A system of one embodiment includes a digital camera, a detection mechanism, a face detection and selection mechanism, and a database. The digital camera takes one or more photos of a person in response to the detection mechanism detecting an event, such as a cash register having rung up a sale to the person, the person entering the premises, and so on. The face detection and selection mechanism determines the best photo of the person that includes the best picture of the person's face. The database stores this photo, along with at least a current date in which the photo was taken. The database may also store the current time at which the photo was taken, a transaction record of the person's purchase, and so on.

A method of one embodiment of the invention takes one or more photos of the person, and determines the best photo that includes the best picture of the person's face. The method stores the best photo with at least the current date in the database. A computer-readable medium of one embodiment has instructions stored thereon to perform a method. This method detects an event, and in response thereto causes a digital camera to take one or more photos of the person. The method determines the best photo of the person that includes the best picture of the face of the person, and causes this best photo to be stored with at least the current date in the database.

At least some embodiments of the invention provide for advantages not found within the prior art. Rather than having to review several days worth of videotape from a video surveillance system, a user only has to scroll through the various faces stored in the database during a period of time, which is likely to be less time-consuming. Because the system determines and stores the best photo of each person's face, the images are likely to be of better quality than those that may be stored on videotape. Where the transaction record of each person's purchase is also recorded, the user may be able to search for the photo of the face of a desired person based on what has been purchased by him or her. Finally, the faces of people stored in the database may be able to be matched against databases of mug shots maintained by law enforcement.

At least some embodiments of the invention may be employed in conjunction with or in lieu of a video surveillance system. Still other advantages, embodiments, and aspects of the invention will become apparent by reading the detailed description that follows, and by referring to the accompanying drawings.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Example Environment and Overview

Figure 1:
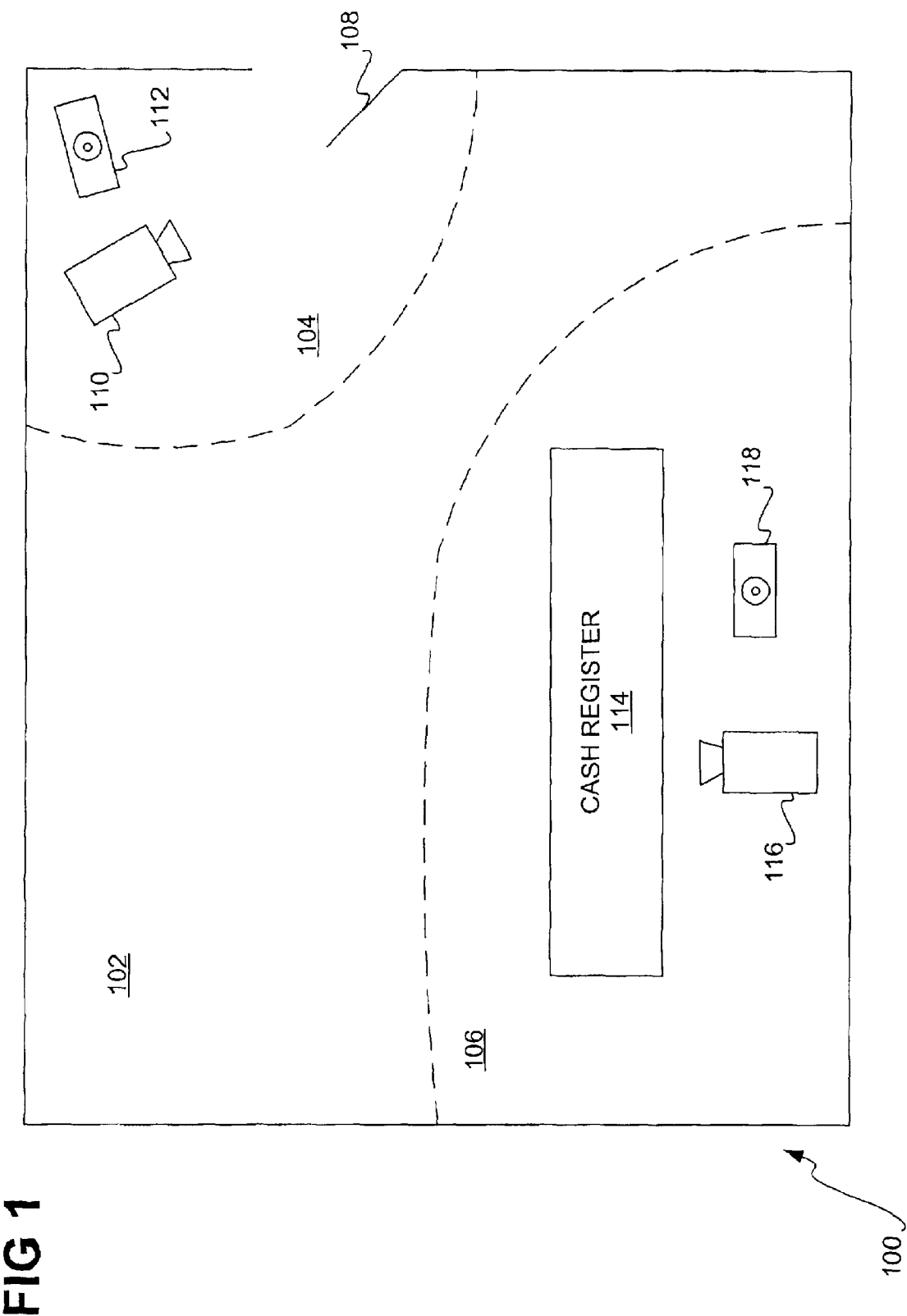
FIG. 1 is a diagram of an example environment in conjunction with which embodiments of the invention may be used.

FIG. 1 shows an example environment in conjunction with which embodiments of the invention may be implemented. More specifically, FIG. 1 shows the premises of a store 100. The store 100 includes a main shopping area 102, an entry area 104, and a checkout area 106. The entry area 104 has a door 108 to allow people to enter the store 100. There is a video camera 110 that is part of a video surveillance system, and a digital camera 112 that is part of an embodiment of the invention. The checkout area 106 includes a cash register counter 114. There is a video camera 116, also part of the video surveillance system, and a digital camera 118, which is also part of the embodiment of the invention.

When a person walks through the door 108 into the store 100, he or she is under video surveillance by the video camera 110. A detection mechanism causes the digital camera 112 to take one or more photos of the person. Similarly, when the person makes a purchase at the cash register counter 114, he or she is under video surveillance by the video camera 116, and a detection mechanism causes the digital camera 118 to take one or more photos of the person. The embodiment of the invention can be used in conjunction with the video surveillance system of which the video cameras 110 and 116 are a part, or in lieu of them.

The set of pictures taken by the digital camera 112 and the set taken by the digital camera 118 are processed to determine a best photo of each set, including a best picture of the face of the person. Preferably along with the current date and time, as well as the transaction record of the purchase made by the person at the counter 114 in the case of the digital camera 118. The best photos from each digital camera 112 and 118 are stored in a database. These photos can then be used for varied purposes and applications, as described later in the detailed description of the invention.

Systems

Figure 2:
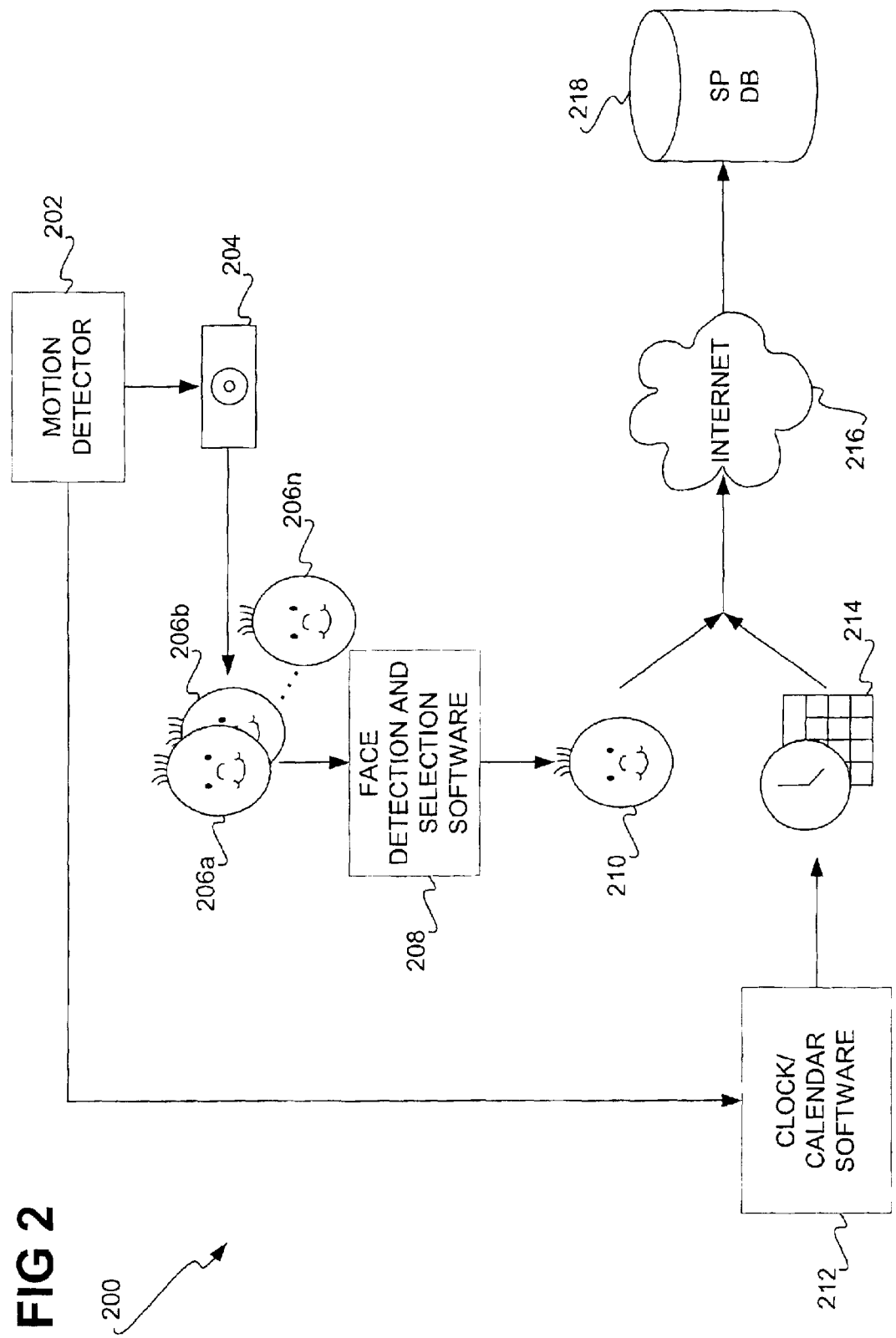
FIG. 2 is a diagram of a system according to an embodiment of the invention.

FIG. 2 shows a system 200 according to an embodiment of the invention. The system 200 may be used at the entry area 104 of FIG. 1, for instance. A motion detector 202 detects the presence of a person. The motion detector 202 may be the video camera 110 of FIG. 1, where a change in the field of view of the video camera 110 from an earlier frame to a later frame indicates that a person has entered the store 100 of FIG. 1. The motion detector 202 may also be the digital camera 112 of FIG. 1. The motion detector 202 is generally a type of detection mechanism. The presence of the person is referred to generally as an event, and is one type of such an event.

In response to detection of the presence of a person, the motion detector 202 causes the digital camera 204 to take a number of photos 206a, 206b, . . . , 206n of the person. The digital camera 204 may be the digital camera 112 of FIG. 1. The photos 206a, 206b, . . . , 206n are input into face detection and selection software 208. The face detection and selection software 208 typically runs on a computer, and is generally a type of face detection and selection mechanism. The face detection and selection software 208 selects the best photo 210 of the photos 206a, 206b, . . . , 206n of the person that includes the best picture of the person's face. The "best" picture in this case is generally defined as the most representative picture of the person's face, or the picture of the person that would be most easily recognized.

It is noted that, in at least some embodiments of the invention, the face detection and selection software 208 does not identify the person in the photo 210, but only selects the best photo 210 of the person in the photos 206a, 206b, . . . , 206n. The best photo 210 is non-restrictively defined as the photo 210 that shows the best picture of the person's face. The best photo 210 may be compressed so that it does not occupy a large amount of storage space. For example, the best photo 210 may be compressed according to a lossy compression scheme, such as the Joint Photographic Experts Group (JPEG) standard. Furthermore, the best photo 210 may also be encrypted, according to any of a number of different encryption schemes, to allay potential privacy concerns.

The motion detector 202 also causes the clock/calendar software 212 to stamp the current time and date 214 on the best photo 210. This is accomplished so that the time and date 214 at which the best photo 210 was taken by the digital camera 204 can later be referenced. The best photo 210, with the current time and date 214, is sent over the Internet 216 for storage at a service provider's database 218. It is thus said that the face detection and selection software 208 and/or the clock/calendar software 212 are communicatively coupled to the database 218 over the Internet 216. The Internet 216 is one type of network. The invention may be implemented in conjunction with other or additional networks as well, such as intranets, extranets, local-area networks (LAN's), wide-area networks (WAN's), and so on.

The best photo 210 and the current time and date 214 may be uploaded to the database 218 as soon as the photo 210 is determined. Alternatively, they may be sent on a batch basis, either every so often, or once a certain number of best photos have been taken. The database 218 as shown in FIG. 2 is remote, in that it is connected to the system 200 over the Internet 216. However, the database 218 may be a local database as well, residing in the same premises as the digital camera 204, the motion detector 202, and so on. The database 218 also stores other best photos and the dates at times at which they were taken, besides the photo 210 and the time and date 214.

The system 200 can be provided as a turnkey operation, in which the owner of the store or other premises in which it is installed does not have to have computer experience. Once the digital camera 204 and the motion detector 202 are situated, and the face detection and selection software 208 and the clock/calendar software 212 are installed, the owner does not have to otherwise maintain the system 200. Rather, the system 200 is maintained by the service provider that also maintains the database 218. Once the best photo 210 and the current date and time 214 are stored in the database 218, they can be used for a variety of different purposes and applications, as is described later in the detailed description.

Figure 3:
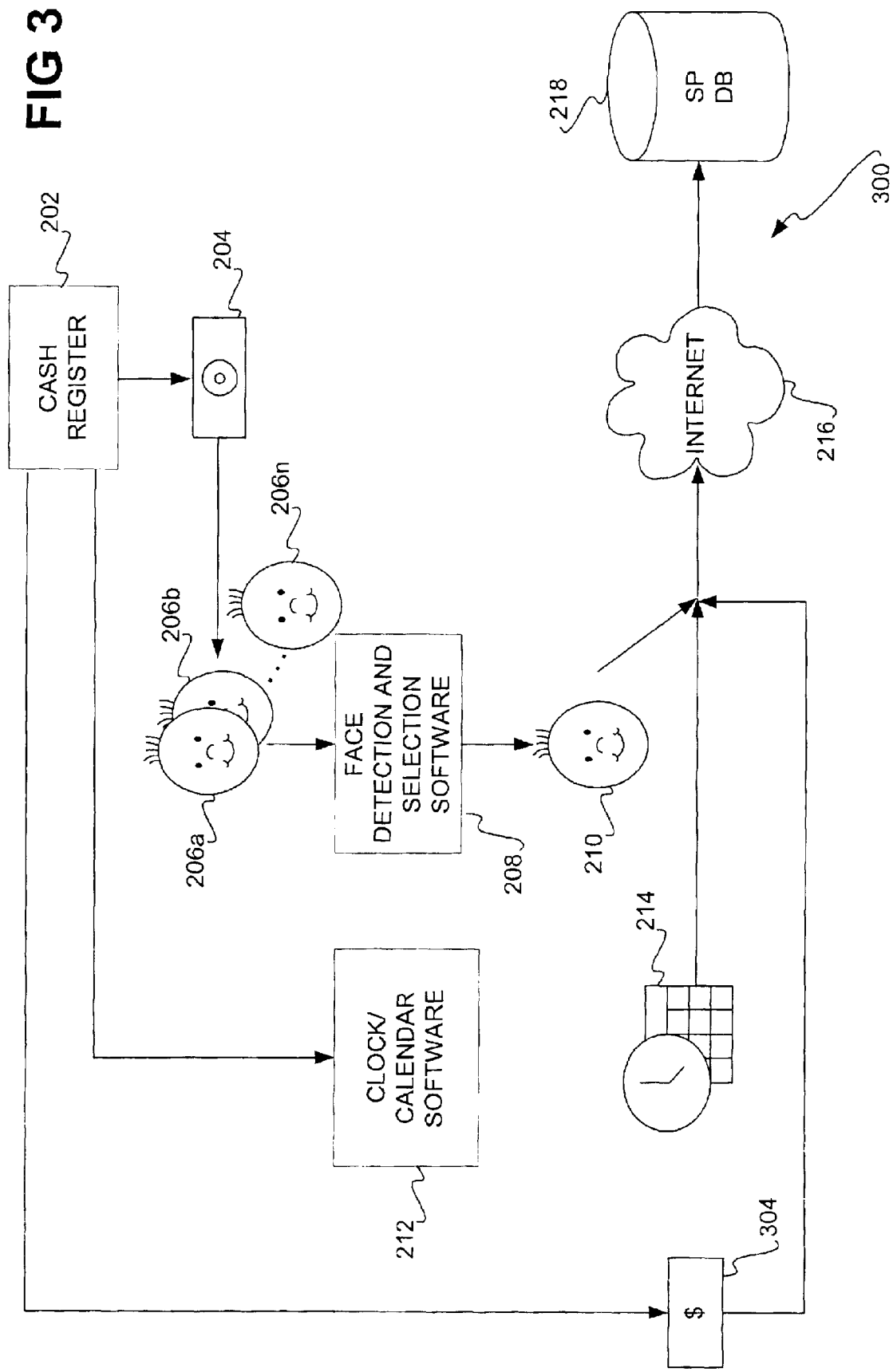
FIG. 3 is a diagram of another system according to an embodiment of the invention.

FIG. 3 shows a system 300 according to another embodiment of the invention. The system 300 may be used at the checkout area 106 of FIG. 1, for instance. When a sale is rung up to a person at the cash register 302, this causes the digital camera 204 to take the number of photos 206a, 206b, . . . , 206n of the person. The cash register 302 may be located at the cash register counter 114 of FIG. 1, whereas the digital camera 204 may be the digital camera 118 of FIG. 1. Alternatively, a motion detector 202, such as the video camera 116 of FIG. 1, can be used to detect the presence of the person. The cash register 302 is also considered as a type of detection mechanism. The ringing up of a sale to the person is also referred to generally as an event, and is one type of such an event.

The photos 206a, 206b, . . . , 206n are again input into the face detection and selection software 208, which selects the best photo 210 therefrom that includes the best picture of the person's face. When the sale is rung up at the cash register 302, this also causes the clock/calendar software 212 to stamp the current time and date 214 on the best photo 210. The best photo 210, along with the current time and date 214, and a transaction record of the sale 304, is sent over the Internet 216, or a different or additional network(s), for storage at the service provider's database 218. The transaction record 304 may include the credit card number used by the person to make the purchase, what was purchased by the person, and so on.

Like the system 200 of FIG. 2, the system 300 of FIG. 3 can be such that the best photo 210, the current time and date 214, and the transaction record 304 may be uploaded to the database 218 individually or on a batch basis. The database 218 may 110 be a local database instead of a remote database. The system 300 of FIG. 3 may also be provided as a turnkey operation to the owner of the store or other premises by the service provider. The system 300 may be used in conjunction with the system 200 of FIG. 2, or as a separate system. Once the best photo 210, the current time and date 214, and the transaction record 304 are stored in the database 218, they can be used for a variety of different purposes and applications, as is described later in the detailed description.

Method and Example Applications and Uses

Figure 4:
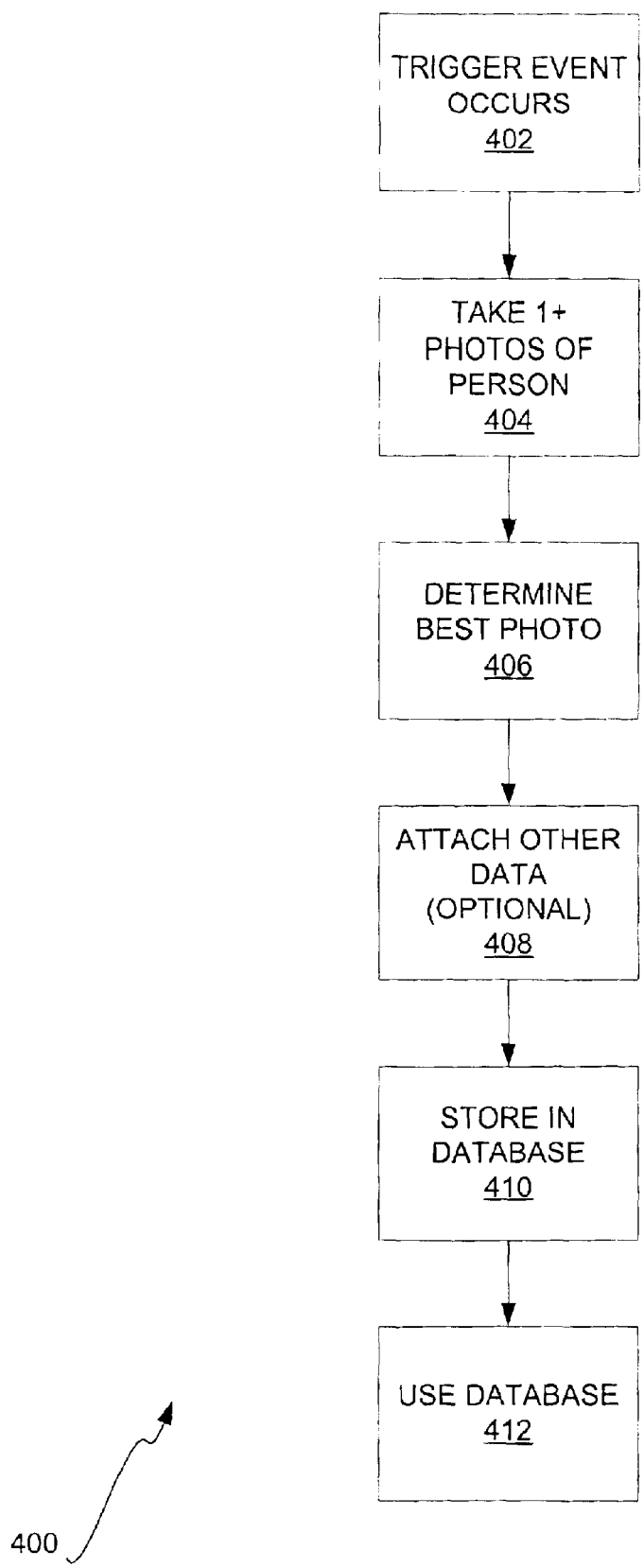
FIG. 4 is a diagram of a method according to an embodiment of the invention.

FIG. 4 shows a method 400 according to an embodiment of the invention. The method 400 may be performed in conjunction with either the system 200 of FIG. 2, the system 300 of FIG. 3, both the systems 200 and 300, or neither system. At least some parts of the method 400 may be performed by the execution of instructions by a processor that are stored on a computer-readable medium, such as a memory, a floppy disk, a CD-ROM, or another computer-readable medium.

First, a trigger event occurs (402). The trigger event may be the detection of the presence of a person, the ringing up of a sale to the person on a cash register, and so on. A number of photos are then taken of the person (404). From these photos, a best photo is selected, or determined, that includes the best picture of the person's face (406). Other data may optionally be attached to the best photo, such as the current time and date, a transaction record, and so on (408). The best photo and the other data are stored in a database, such as the service provider's database (410). This may be accomplished by sending the best photo and other data over a network, such as the Internet, for storage in a remote database. The photos stored in the database may then be used as desired, for a variety of different applications and purposes (412).

Figure 5:
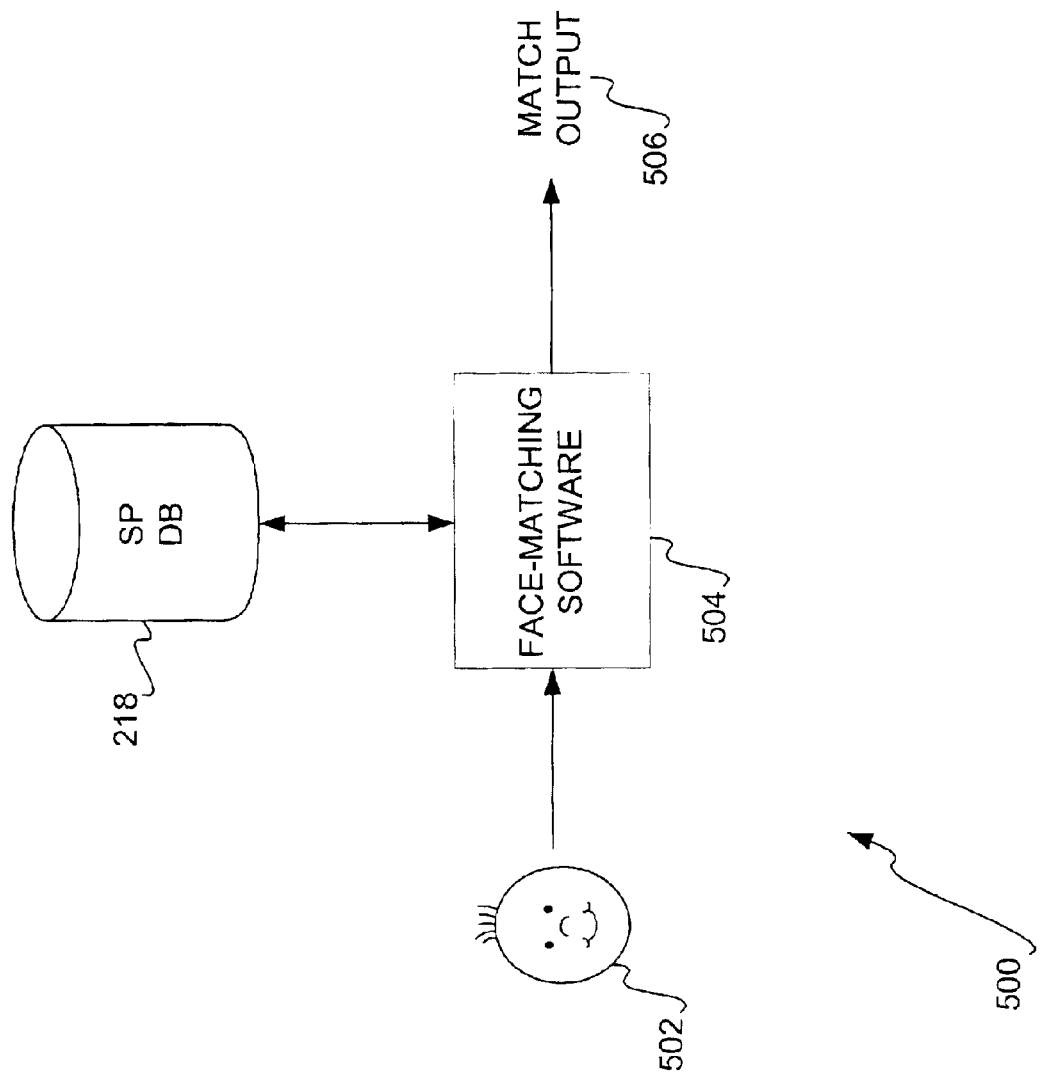
FIG. 5 is a diagram of an example application in conjunction with which embodiments of the invention may be used.

FIG. 5 shows a system 500 of one example application and use for the photos stored in the database. The photo 502 includes the face of a person. The system 500 determines whether this person has visited the store or other premises for which the database of photos 218 has been maintained as has been described. For example, the photo 502 may include the face of a person that is wanted by law enforcement, as a possible suspect in a string of robberies. Face-matching software 504, which usually runs on a computer, determines whether the face in the photo 502 matches any of the faces of the photos stored in the database 218. The software 504 then provides an output 506 indicating its conclusion. If a match was found, the software 504 can provide the date and time at which the person visited the store or other premises, and possibly the transaction record of a purchase made by this person.

At least some embodiments of the invention are amenable to other types of applications and uses. For example, a photo of a face of a person that is stored in the database 218 maybe matched by the face-matching software 504 against a database of mug shot photos maintained by law enforcement. The photo may be of a person that has stolen something from the store or other premises. Therefore, the face in the photo is desirably matched against the photo database maintained by law enforcement, to determine whether the person has committed other crimes in the past.

Another example is to match a credit card submitted by a customer for the purchase of an item with the photos of the person(s) who previously used the same credit card. A customer, for instance, may give the clerk behind the counter 114 of FIG. 1 a credit card. When the clerk swipes this card for validation purposes, the photos of the person(s) who previously used this credit card at the store are displayed to the clerk. The clerk can then make a quick decision as to whether the current customer is the same person shown in the photos, or if, for example, the credit card was stolen by the customer.

Applications and uses that are not related to law enforcement and security are also contemplated. For example, when the best photo 204 is selected, different face-matching software may immediately compare the best photo 204 with the photos stored in the database 218. For any matches that are found, the software may display the associated dates, times, and transaction records to the storeowner, either in real-time, or at a later time. The owner of the store or other premises can, for instance, determine whether a repeat customer has entered his or her store, and view that customer's previous purchases. The owner can use this information while the customer is in the store to show the customer additional attention, in an attempt to increase sales.

It is noted that, although specific embodiments have been illustrated and described herein, it will be appreciated by those of ordinary skill in the art that any arrangement is calculated to achieve the same purpose may be substituted for the specific embodiments shown. For example, other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

I claim:

1. A surveillance system comprising:
   a digital camera;
   a detection mechanism to cause the digital camera to take one or more photos of a person, in response to detection of an event;
   a face detection and selection mechanism to determine a best photo of the one or more photos of the person, the best photo including a best picture of the face of the person from which the person is most easily recognized; and,
   a database to store the best photo of the face of the person with at least a current date in which the best photo was taken, the database also storing a plurality of best photos of faces of people.

2. The system of claim 1, wherein the detection mechanism comprises a motion detector to detect presence of the person, such that detection of the presence of the person causes the digital camera to take the one or more photos.

3. The system of claim 1, wherein the detection mechanism comprises a video camera, such that a change in a field of view of the video camera from an earlier frame to a later frame of the video camera causes the digital camera to take the one or more photos.

4. The system of claim 1, wherein the detection mechanism comprises a cash register, such that ringing up a sale to the person on the cash register causes the digital camera to take the one or more photos.

5. The system of claim 4, wherein the database further stores a transaction record of the sale.

6. The system of claim 1, wherein the detection mechanism is the digital camera itself.

7. The system of claim 1, wherein the face detection and selection mechanism comprises face detection and selection software running on a computer.

8. The system of claim 1, wherein the face detection and selection mechanism at least one compresses and encrypts the best photo of the face before the database stores the best photo of the face.

9. The system of claim 1, wherein the face detection and selection mechanism is communicatively coupled to the database over a network.

10. The system of claim 1, wherein the database further stores a current time at which the best photo was taken.

11. A surveillance method comprising:

taking one or more photos of a person;

determining a best photo of the one or more photos of the person, the best photo including a best picture of a face of the person from which the person is most easily recognized; and, storing the best photo of the face of the person with at least a current date in which the best photo was taken in a database also storing a plurality of best photos of faces of people.

12. The method of claim 11, initially comprising detecting an event, in response to which the one or more photos of the person are taken.

13. The method of claim 12, wherein detecting the event comprises detecting a presence of the person.

14. The method of claim 12, wherein detecting the event comprises detecting a sale to the person having rung up on a cash register.

15. The method of claim 14, wherein storing the best photo of the face of the person with at least the current date comprises storing the best photo of the face of the person with at least the current date and a transaction record of the sale.

16. The method of claim 11, wherein storing the best photo of the face of the person with at least the current date comprises storing the best photo of the face of the person with at least the current date and a current time at which the best photo was taken.

17. The method of claim 11, further comprising, alter determining the best photo, sending the best photo of the face of the person with at least the current date to the database over a network.

18. A computer-readable medium having instructions stored thereon to perform a surveillance method comprising:

detecting a event;

in response to detecting the event, causing a digital camera to take one or more photos of a person;

determining a best photo of the one or more photos of the person, the best photo including a best picture of a face of the person from which the person is most easily recognized; and, causing the best photo of the face of the person to be stored with at least a current date in which the best photo was taken in a database also storing a plurality of best photos of faces of people.

19. The medium of claim 18, wherein detecting the event comprises one of: detecting a change in a field of view of a video camera from an earlier frame to a later frame, and detecting a sale to the person having rung up on a cash register.

20. The medium of claim 18, wherein causing the best photo of the person to be stored with at least the current date comprises sending the best photo of the face of the person and at least the current date to the database over a network.

* * * * *

UNITED STATES PATENT AND TRADEMARK OFFICE
CERTIFICATE OF CORRECTION

PATENT NO. : 6,793,128 B2
DATED : September 21, 2004
INVENTOR(S) : John W. Huffman It is certified that error appears in the above-identified patent and that said Letters Patent is hereby corrected as shown below:

Column 4,
Line 19, delete "at" and insert therefore -- and --

Column 8,
Line 1, delete "alter" and insert therefor -- after --

Signed and Sealed this

Nineteenth Day of April, 2005

JON W. DUDAS
*Director of the United States Patent and Trademark Office*